US012593114B2

(12) United States Patent
Aksu et al.

(10) Patent No.: US 12,593,114 B2
(45) Date of Patent: Mar. 31, 2026

(54) APPARATUS AND A METHOD FOR SIGNALING INFORMATION IN A CONTAINER FILE FORMAT

(71) Applicant: Nokia Technologies Oy, Espoo (FI)

(72) Inventors: Emre Aksu, Tampere (FI); Miska Hannuksela, Tampere (FI); Jonne Mäkinen, Tampere (FI); Juha-Pekka Hippeläinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/291,893

(22) PCT Filed: Nov. 20, 2019

(86) PCT No.: PCT/FI2019/050829
§ 371 (c)(1),
(2) Date: May 6, 2021

(87) PCT Pub. No.: WO2020/120833
PCT Pub. Date: Jun. 18, 2020

(65) Prior Publication Data
US 2022/0007088 A1     Jan. 6, 2022

(30) Foreign Application Priority Data
Dec. 10, 2018     (FI) ..................................... 20186063

(51) Int. Cl.
*H04N 21/854*          (2011.01)
*G06F 16/583*          (2019.01)
(Continued)

(52) U.S. Cl.
CPC ..... *H04N 21/85406* (2013.01); *G06F 16/583* (2019.01); *G06F 16/783* (2019.01);
(Continued)

(58) Field of Classification Search
CPC .. H04N 21/85406; H04N 19/12; H04N 19/70; H04N 21/84; G06F 16/783; G06F 16/583
See application file for complete search history.

(56) References Cited

U.S. PATENT DOCUMENTS 9,928,297 B2 * 3/2018 Hendry .................. H04N 19/50
11,093,387 B1 * 8/2021 Chinthekindi ........ G06F 3/0646
(Continued)

FOREIGN PATENT DOCUMENTS

CN        101611630 A     12/2009
CN        104904233 A     9/2015
(Continued)

OTHER PUBLICATIONS

"Information Technology—HighEfficiency Coding and Media Delivery in Heterogeneous Environments—Part 12: Image File Format", ISO/IEC 23008-12, First Edition, Dec. 2017, 82 pages.
(Continued)

*Primary Examiner* — Pinkal R Chokshi
(74) *Attorney, Agent, or Firm* — McCarter & English LLP

(57) ABSTRACT

The embodiments relate to a method comprising receiving visual data from image capturing means, said visual data comprising a plurality of entities (510); processing the visual data to determine one or more grouping types for at least selected entities of said plurality of entities (520); storing said one or more grouping types as a metadata of a container file format, said one or more grouping types being associated with said selected entities (530); and including the metadata to a container file in association with said visual data (540).

15 Claims, 5 Drawing Sheets

(51) Int. Cl.

| | | |
|---|---|---|
| *G06F 16/783* | (2019.01) | |
| *H04N 19/12* | (2014.01) | |
| *H04N 19/70* | (2014.01) | |
| *H04N 21/84* | (2011.01) | |

(52) U.S. Cl.
CPC ............. *H04N 19/12* (2014.11); *H04N 19/70* (2014.11); *H04N 21/84* (2013.01)

(56) References Cited

U.S. PATENT DOCUMENTS

| | | | | |
|---|---|---|---|---|
| 11,317,020 | B1 * | 4/2022 | Krishnamurthy .... | H04N 5/2252 |
| 2014/0282099 | A1 | 9/2014 | Bronder et al. | |
| 2016/0232233 | A1 | 8/2016 | Hendry et al. | |
| 2016/0232939 | A1 | 8/2016 | Malamal Vadakital et al. | |
| 2017/0168697 | A1 * | 6/2017 | Shpalter ................ | G11B 27/34 |
| 2018/0146225 | A1 | 5/2018 | Hannuksela et al. .......... | 21/434 |
| 2020/0293160 | A1 * | 9/2020 | Soyarslan ........... | G06F 16/9558 |
| 2021/0058633 | A1 * | 2/2021 | Pettersson ............ | H04N 19/119 |
| 2021/0109970 | A1 * | 4/2021 | Ouedraogo ............. | G06F 16/93 |

FOREIGN PATENT DOCUMENTS

| | | | |
|---|---|---|---|
| CN | 107534801 | A | 1/2018 |
| CN | 107852532 | A | 3/2018 |
| GB | 2575288 | A | 1/2020 |
| JP | 2018-510546 | A | 4/2018 |
| JP | 2018-513574 | A | 5/2018 |
| JP | 2018522469 | A | 8/2018 |
| WO | WO-2016/130210 | A1 | 8/2016 |
| WO | 2019/197723 | A1 | 10/2019 |

OTHER PUBLICATIONS

"JPEG Tags", ExifTool, Retrieved on Apr. 28, 2021, Webpage available at : https://sno.phy.queensu.ca/~phil/exiftool/TagNames/JPEG.html.

"Information Technology—Coding Of Audio-Visual Objects—Part 12: ISO Base Media File Format", ISO/IEC 14496-12, Fifth edition, Feb. 20, 2015, 254 pages.

"Information Technology—Coding Of Audio-Visual Objects—Part 14: MP4 File Format", ISO/IEC 14496-14, First edition, Nov. 15, 2003, 18 pages.

"Information Technology—Coding Of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to- end packet switched streaming service (PSS); 3GPP file format (3GP) (Release 15)", 3GPP TS 26.244, V15.0.0, Jun. 2018, pp. 1-67.

"High Efficiency Video Coding", Series H: Audiovisual And Multimedia Systems, Infrastructure of audiovisual services—Coding of moving video, Recommendation ITU-T H.265, Feb. 2018, 692 pages.

Office action received for corresponding Finnish Patent Application No. 20186063, dated Jul. 9, 2019, 9 pages.

Hannuksela et al., "Technology under Consideration on ISO/IEC 23008-12", ISO/IEC JTC1/SC29/WG11 MPEG2018/N17962, Systems, Oct. 2018, 17 pages.

International Search Report and Written Opinion received for corresponding Patent Cooperation Treaty Application No. PCT/FI2019/050829, dated Feb. 27, 2020, 18 pages.

Extended European Search Report received for corresponding European Patent Application No. 19894515.6, dated Jun. 21, 2022, 8 pages.

Office action received for corresponding Japanese Patent Application No. 2021-531473, dated Sep. 12, 2022, 7 pages of office action and 8 pages of translation available.

"Technology under Consideration on ISO/IEC 23008-12", 126. MPEG Meeting; Mar. 25, 2019-Mar. 29, 2019; Geneva; (Motion Picture Expert Group or ISO/IEC JTC1/SC29/WG11 ), No. n18392 Apr. 24, 2019 (Apr. 24, 2019).

Emre B Aksu (Nokia) et al: "[HEIF] Logical grouping of entities", 125. MPEG Meeting; Jan. 14, 2019-Jan. 18, 2019; Marrakech; (Motion Picture Expert Group or ISO/IEC JTC1/SC29/WG11 ), No. m46034 Jan. 9, 2019 (Jan. 9, 2019).

"Technology under Consideration on ISO/IEC 23008-12", 125. MPEG Meeting; Jan. 14, 2019-Jan. 18, 2019; Marrakech; (Motion Picture Expert Group or ISO/IEC JTC1/SC29/WG11 ), No. n18226 Feb. 4, 2019 (Feb. 4, 2019).

* cited by examiner

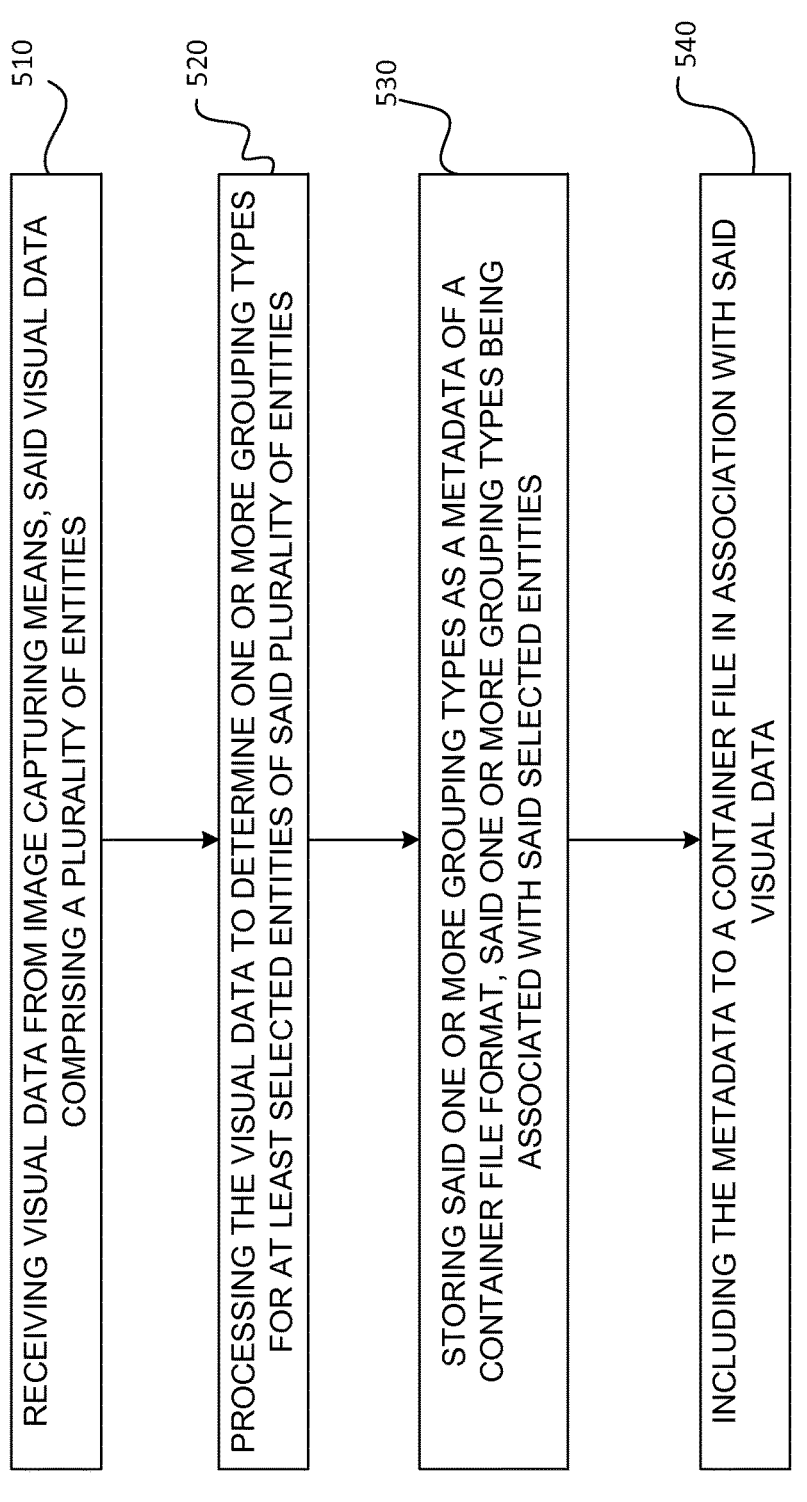

510

RECEIVING VISUAL DATA FROM IMAGE CAPTURING MEANS, SAID VISUAL DATA COMPRISING A PLURALITY OF ENTITIES

520

PROCESSING THE VISUAL DATA TO DETERMINE ONE OR MORE GROUPING TYPES FOR AT LEAST SELECTED ENTITIES OF SAID PLURALITY OF ENTITIES

530

STORING SAID ONE OR MORE GROUPING TYPES AS A METADATA OF A CONTAINER FILE FORMAT, SAID ONE OR MORE GROUPING TYPES BEING ASSOCIATED WITH SAID SELECTED ENTITIES

540

INCLUDING THE METADATA TO A CONTAINER FILE IN ASSOCIATION WITH SAID VISUAL DATA

Fig. 5

APPARATUS AND A METHOD FOR SIGNALING INFORMATION IN A CONTAINER FILE FORMAT

RELATED APPLICATION

This application claims priority to PCT Application No. PCT/FI2019/050829, filed on Nov. 20, 2019, which claims priority to Finnish Application No. 20186063, filed on Dec. 10, 2018, each of which is incorporated herein by reference in its entirety.

TECHNICAL FIELD

The present solution generally relates to signaling information in container file format.

BACKGROUND

The syntax of many media file formats is based on a hierarchical list of type and length prefixed data chunks or boxes, where the naming depends on the format in question. In a container file according to ISO base media file format (ISOBMFF; ISO/IEC 14496-12), the media data and metadata is arranged in various types of boxes. Many formats are derived from ISOBMFF, including the High Efficiency Image File Format (HEIF, ISO/IEC 23008-12), MPEG-4 file format (ISO/IEC 14496-14, also known as the MP4 format), file format for NAL unit structured video (ISO/IEC 14496-15) and 3GPP file format (3GPP TS 26.244, also known as the 3GP format). These formats use the same box-structured basic structure.

High Efficiency Video Coding (HEVC) is an efficient video compression standard also known as H.265 and MPEG-H Part 2. High Efficiency Image File Format (HEIF) is based on the HEVC and is a file format for storing digital images and image sequences.

SUMMARY

The present embodiments improve the current version of HEIF by providing a mechanism to store logical information that may be used, for example, in social image applications and image management systems. Various aspects include a method, an apparatus and a computer readable medium comprising a computer program stored therein, which are characterized by what is stated in the independent claims. Various embodiments are disclosed in the dependent claims.

According to a first aspect, there is provided a method comprising receiving visual data from image capturing means, said visual data comprising a plurality of entities; processing the visual data to determine one or more grouping types for at least selected entities of said plurality of entities; storing said one or more grouping types as a metadata of a container file format, said one or more grouping types being associated with said selected entities; and including the metadata to a container file in association with said visual data.

According to a second aspect, there is provided an apparatus comprising means for means for receiving visual data from image capturing means, said visual data comprising a plurality of entities; means for processing the visual data to determine one or more grouping types for at least selected entities of said plurality of entities; means for storing said one or more grouping types as a metadata of a container file format, said one or more grouping types being associated with said selected entities; and means for including the metadata to a container file in association with said visual data.

According to a third aspect, there is provided an apparatus comprising at least one processor and memory including computer program code, wherein said computer program code comprises instructions that when executed by the processor, cause the apparatus to receive visual data from image capturing means, said visual data comprising a plurality of entities; process the visual data to determine one or more grouping types for at least selected entities of said plurality of entities; store said one or more grouping types as a metadata of a container file format, said one or more grouping types being associated with said selected entities; and include the metadata to a container file in association with said visual data.

According to a fourth aspect, there is provided a computer program product comprising computer program code configured to, when executed on at least one processor, cause an apparatus or a system to receive visual data from image capturing means, said visual data comprising a plurality of entities; process the visual data to determine one or more grouping types for at least selected entities of said plurality of entities; store said one or more grouping types as a metadata of a container file format, said one or more grouping types being associated with said selected entities; and include the metadata to a container file in association with said visual data.

According to an embodiment, the plurality of entities is composed of burst images, favorites, album images, image collections, image sequences, video tracks.

According to an embodiment, information on the grouping type is stored as a metadata of the container file.

According to an embodiment, a descriptive information in association with one or more entities of the plurality of entities that have been determined to share the same grouping type is stored as a metadata of the container file.

According to an embodiment, the container file format is a High Efficiency Image File Format or a High Efficiency Image File compatible storage format.

According to an embodiment, the visual data is transmitted with said one or more grouping types in said container file format to a rendering device or a media processing system able to interpret the transmitted visual data.

DESCRIPTION OF THE DRAWINGS

In the following, various embodiments will be described in more detail with reference to the appended drawings, in which

FIG. 5 is a flowchart illustrating a method according to an embodiment.

DESCRIPTION OF EXAMPLE EMBODIMENTS

In the following, several embodiments will be described in the context of ISO base media file format (ISOBMFF), such as High Efficiency Image File (HEIF) format or a High Efficiency Image File compatible storage format (e.g.

MPEG-4). However, it is appreciated that teachings of the present embodiments can be applied in other container file formats as well.

Figure 1:
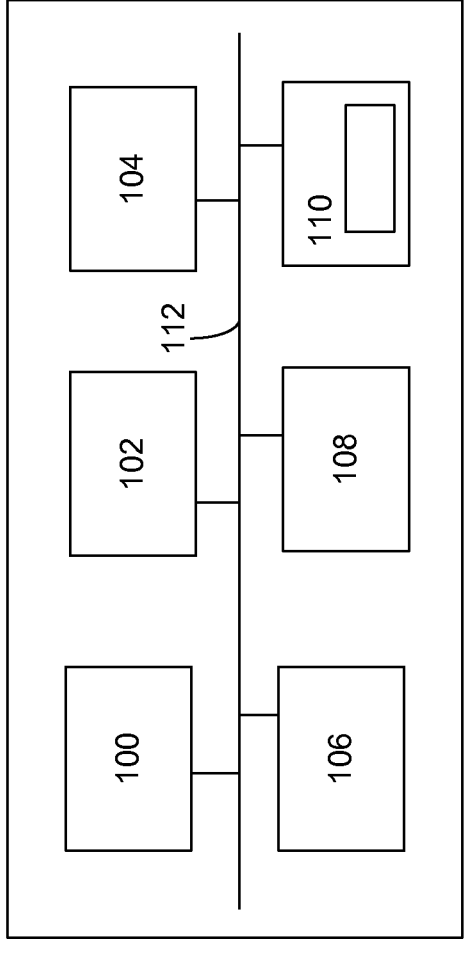
FIG. 1 shows an apparatus according to an embodiment.

FIG. 1 shows a computer system suitable to be used in data processing according to an embodiment. The generalized structure of the computer system will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100. Computer program code resides in the memory 102. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

It needs to be understood that different embodiments allow different parts to be carried out in different elements. For example, various processes of the computer system may be carried out in one or more processing devices; for example, entirely in one computer device, or in one server device or across multiple user devices.

Some concepts, structures, and specifications of ISOBMFF are described below as an example of a container file format, based on which the embodiments may be implemented. As mentioned above, the aspects of the invention are not limited to ISOBMFF, but rather the description is given for one possible basis on top of which the present improvement may be partly or fully realized.

ISOBMFF is a file format containing timed media information for presentation, i.e. timing, structure and media information for media data. A basic building block in the ISO base media file format is called a box. A box is an object-oriented building block defined by a unique identifier (e.g. four-character code (4CC)) and a length. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes.

In files conforming to the ISO base media file format, the media data may be provided in a MediaDataBox 'mdat' and the MovieBox 'moov' may be used to enclose the metadata. In some cases, for a file to be operable, both of the 'mdat' and 'moov' boxes may be required to be present. The movie 'moov' box may include one or more tracks, and each track may reside in one corresponding TrackBox 'trak'. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an 'mdat' box, if they are in the same file as the 'moov' box. For the metadata of the movie fragments, however, a 'moof' box may be provided. The 'moof' box may include the information for a certain duration of playback time that would previously have been in the 'moov' box. The 'moov' box may still represent a valid movie on its own, but in addition, it may include an 'mvex' box indicating that movie fragments will follow in the same file. The movie fragments may extend the presentation that is associated to the 'moov' box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the 'moof' box may be limited to a subset of the metadata that may be included in a 'moov' box and may be coded differently in some cases. Details regarding the boxes that can be included in a 'moof' box may be found from the ISO base media file format specification. A self-contained movie fragment may be defined to consist of a 'moof' box and an 'mdat' box that are consecutive in the file order and where the 'mdat' box contains the samples of the movie fragment (for which the 'moof' box provides the metadata) and does not contain samples of any other movie fragment (i.e. any other 'moof' box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
        unsigned int(32) track_IDs[ ];
}
``` track_IDs may be specified as an array of integers providing the track identifiers of the referenced tracks or track_group_id values of the referenced track groups. Each value of track_IDs [i], where i is a valid index to the track_IDs [] array, is an integer that provides a reference from the containing track to the track with track_ID equal to track_IDs [i] or to the track group with both track_group_id equal to track_IDs [i] and a particular bit (e.g. the least significant bit) of the flags field of TrackGroupTypeBox equal to 1. When a track_group_id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples. Term "sample" refers to any data in the file having a single timestamp, for example an individual frame of a video, a series of video frames in decoding order, a compressed section of audio in decoding order. The mechanisms include: sample groups, timed metadata tracks, and sample auxiliary information. Derived specification may provide similar functionality with one or more of these three mechanisms.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox ('sbgp') represents the assignment of samples to sample groups; and (2) a SampleGroupDescriptionBox ('sgpd') contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The High Efficiency Image File Format (HEIF) includes a rich set of features building on top of the widely used ISO Base Media File Format (ISOBMFF), making HEIF feature-wise superior compared to other image file formats. In the present disclosure, terms "HEIF", "ISOBMFF" and "file format" can be used interchangeably.

The ISOBMFF structures and features are used to a large extent in the design of HEIF. The basic design for HEIF comprises that still images are stored as items and image sequences are stored as tracks. HEIF enables storage of multiple images and image sequences in the same container file.

In the context of HEIF, the following boxes may be contained within the root-level 'meta' box and may be used as described in the following (see also FIG. 4 for illustration). In HEIF, the handler value of the HandlerBox ('hdlr') of the 'meta' box is 'pict'. The resource (whether within the same file, or in an external file identified by a uniform resource identifier) containing the coded media data is resolved through the DataInformationBox ('dinf'), whereas the ItemLocationBox ('iloc') stores the position and sizes of every item within the referenced file. The ItemReferenceBox ('iref') documents relationships between items using typed referencing. If there is an item among a collection of items that is in some way to be considered the most important compared to others then this item is signaled by the PrimaryItemBox ('pitm'). Apart from the boxes mentioned here, the 'meta' box is also flexible to include other boxes that may be necessary to describe items.

Any number of image items can be included in the same file. Given a collection images stored by using the 'meta' box approach, there may be a need to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox ('iprp') enables the association of any item with an ordered set of item properties. Item properties are small data records. The ItemPropertiesBox ('iprp') comprises two parts: ItemPropertyContainerBox 'ipco' that contains an implicitly indexed list of item properties, and one or more ItemPropertyAssociationBox(es) ('ipma') that associate items with item properties. Item property is formatted as a box.

A descriptive item property may be defined as an item property that describes rather than transforms the associated item. A transformative item property may be defined as an item property that transforms the reconstructed representation of the image item content.

In the HEIF specification, term "entity" is used for referring to an image item or a media track. Such entities can be grouped by using the EntityToGroup box. This box enables the grouping of the images, image sequences and video tracks. Entity groups are indicated in GroupsListBox. For example, entity groups specified in GroupsListBox of a movie-level Meta Box refer to movie-level items, and entity groups specified in GroupsListBox of a file-level MetaBox refer to tracks or file-level items.

GroupsListBox contains EntityToGroupBox(es), each specifying one entity group specified for the file.

The definition of the GroupsListBox comprises:

Box type: 'grpl'

Container: MetaBox ('Theta') that is not contained in AdditionalMetadataContainerBox Mandatory: No Quantity: Zero or one The definition of the EntityToGroupBox comprises:

Box type: As specified below with the grouping_type value for the

EntityToGroupBox

Container: GroupsListBox

Mandatory: No

Quantity: Zero or none

The EntityToGroupBox specifies an entity group. The box type (grouping_type) indicates the grouping type of the entity group. Each grouping_type code is associated with semantics that describes the grouping.

The following grouping_type values are specified in HEIF or ISOBMFF:

'alt'r: The items and tracks mapped to this grouping are alternatives to each other, and only one of them should be played or processed by other means;

'ster': The output images of the image items form a stereo pair suitable for displaying on a stereoscopic display.

While item properties and entity grouping were first specified in HEIF, they have been later included in ISOBMFF too.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. A URI comprises a scheme part (identifying e.g. the protocol for the URI) and a hierarchical part identifying the resource, and these two parts are separated by a colon character. A URI may optionally comprise a query part (separated by the character'?') and/or a fragment part (separated by the character '#'). The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

URL fragment identifiers (which may also be referred to as URL forms) may be specified for a particular content type to access a part of the resource, such as a file, indicated by the base part of the URL (without the fragment identifier). URL fragment identifiers may be identified for example by a hash ('#') character within the URL. For the ISOBMFF, it may be specified that URL fragments "#X" refers to a track with track_ID equal to X, "#/item_ID=" and "#item_name=" refer to file level MetaBox(es), "#/item_ID=" and "#item_name=" refer to the meta box(es) in the MovieBox, and "#track_ID=X/item_ID=" and "#track_ID= X/item_name=" refer to MetaBoxes in the track with track_ID equal to X, including the MetaBoxes potentially found in movie fragments.

The current version of HEIF lacks means for grouping entities in logical manner together, and for supporting storage and signaling, for example, of the following widely used features:

1) albums which are composed of multiple images and video tracks;

2) image tagging;

3) favorites.

Lack of a mechanism to store such logical information affects the usability of HEIF format negatively, when compared to already existing social image applications and image management systems.

The present embodiments enable logical grouping and signaling of information on such grouping in one container. According to some embodiments, new grouping types and rules are defined that provide the needed semantics in order to interpret, display and render the content properly or provide user interaction accordingly. According to some embodiments, a new descriptive item property carries the metadata to indicate how images and image sequences are logically related to each other. The present embodiments strengthens HEIF's promise of keeping all the relevant information concerning images, image sequence(s) and/or media track(s) in the same container, because as a result of the solution, there is no need to carry such information outside the file format in some other form.

The new definitions and constraints for HEIF file format are meant for storage of images and image sequences. Separate embodiments are presented for each of the following approaches:

1. Logical Entity to Group Box;

2. Logical Group Property;

3. Tag Property;

4. URL (Uniform Resource Locator) fragment scheme for logical groups and/or tags;

5. URL query strings for logical groups and/or tags.

Embodiments are presented below with reference to particular syntax. It needs to be understood that the presented syntax is merely an example of a realizing the invention, and embodiments can be formed similarly by alternative syntax. For example, information on grouping type could comprise but is not limited to one or more of the following in the syntax below and similar embodiments:

An enumerated logical grouping type value;

A text string of a group name;

A text string of a group description;

Zero or more textual tags describing the group;

Per one or more of the items above, an identifier (e.g. a URN or universally unique identifier, UUID) of an algorithm or a provider of the information.

Each of the previously presented embodiments for the new definitions and constraints are discussed in more detailed manner in below. The detailed discussion provides information on the definition, syntax and semantics of each box.

1. Logical Entity To Group Box:

Definition:

Box type: 'lgrp'

Container: GroupsListBox

Mandatory (per an item): No

Quantity (per an item): Zero or more

Syntax:

```
aligned(8) class LogicalEntityToGroupBox
    extends EntityToGroupBox('lgrp', version = 0, flags = 0) {
    unsigned int(16) logical_group_type
    utf8string group_name;
```

-continued

```
        utf8string group_description;
        utf8string group_tags;
    }
```

Log icalEntityToGroupBox extends the EntityToGroup-Box in order to provide additional metadata for grouping multiple entities.

Logical_group_type is an unsigned integer which indicates the type of grouping. The logical grouping types may comprise but are not limited to the following:

0: undefined
1: Album
2: Favorites
3:<other additional types> group_name is a null-terminated string containing human-readable name for the logical group of entities.

group_description is a null-terminated string containing human-readable description of the logical group of entities.

group_tags is a null-terminated string containing any additional information regarding the logical group which may be well-formatted payload.

Items and tracks listed inside the box are logically linked together under the defined logical_group_type. There may be many instances of the same logical_group_type. For example, the same image may belong to multiple albums.

An example of usage is presented with reference to a HEIF file with 4 image items with IDs: image_1, image_2, image_3, image_4. In this example, there are two album definitions and one favorite images definition:

LogicalEntityToGroupBox ('lgrp')
{item_ids=(image_1, image_2), logical_group_type=1, group_name="Day 1", group_description="Mountain photos of the day", group_tags="mountain, sunrise, birds, lake"}

LogicalEntityToGroupBox('lgrp')
{item_ids=(image_3, image_4), logical_group_type=1, group_name="Day 2", group_description="Seaside photos of the day", group_tags="sea, coast, ship, swimming"}

LogicalEntityToGroupBox('lgrp'{item_ids=(image_1, image_4), logical_group_type=2, group_name="Day 2", group_description="Favorite pics of the 2 day trip", group_tags="sea, mountain, swimming"

As can be seen from the above example, an image item can be present in multiple logical groups.

2. Logical Group Property:

As an alternative to entity grouping, it is also possible to define a logical group property and link it to the appropriate items.

Definition:
Box type: 'lgrp'
Property type: Descriptive item property
Container: ItemPropertyContainerBox
Mandatory (per an item): No
Quantity (per an item): Zero or more
Syntax:

```
aligned(8) class LogicalGroupProperty
    extends ItemFullProperty('lgrp', version = 0, flags = 0) {
    unsigned int(16) logical_group_type;
    utf8string group_name;
    utf8string group_description;
    utf8string group_tags;
    }
}
```

The semantics of the fields are the same as in Log icalEntityToGroupBox: group_name is a null-terminated string containing human-readable name for the logical group of entities.

group_description is a null-terminated string containing human-readable description of the logical group of entities.

group_tags is a null-terminated string containing any additional information regarding the logical group which may be well-formatted payload.

LogicalGroupProperty may be associated to the relevant image items by utilizing the ItemPropertyAssociationBox, the syntax of which is presented below:

```
aligned(8) class ItemPropertyAssociation
    extends FullBox('ipma', version, flags)
{
    unsigned int(32) entry_count;
    for(i = 0; i < entry_count; i++) {
        if (version < 1)
            unsigned int(16) item_ID;
        else
            unsigned int(32) item_ID;
        unsigned int(8) association_count;
        for (i=0; i<association_count; i++) {
            bit(1) essential;
            if (flags & 1)
                unsigned int(15) property_index;
            else
                unsigned int(7) property_index;
        }
    }
}
```

It should be noted that tracks may not be able to be linked to the logical groups when this mechanism is utilized unless the HEIF specification is extended so that the ItemPropertyAssociation could have both item_ids and track Ids. This could be done by defining new version of the ItemPropertyAssociationBox where item_ID is replaced by entity_ID and an entity_ID is defined as defined in the EntitytoGroupBox. However, this may not be the preferred approach due to file backwards compatibility. Hence it is more advantageous to utilize the LogicalEntityToGroupBox.

3. Tag Property

The embodiments (1) and (2) presented above can also be realized without the group_tags syntax element. The embodiment in this section can be used with either embodiment above (particularly if no group_tags is present) or independently of the embodiments above. A tag "descriptive item property" is specified in this embodiment. Image items associated with the same tag item property can be regarded as belonging to a logical group characterized by that tag.

Definition:
Box type: 'ttag'
Property type: Descriptive item property
Container: ItemPropertyContainerBox
Mandatory (per an item): No
Quantity (per an item): Zero or more
Syntax:

```
aligned(8) class TagProperty
    extends ItemFullProperty('ttag', version = 0, flags = 0) {
    utf8string textual_tag;
    // Other syntax elements may be present
    // depending on values of the textual_tag or flags.
    // Parsers that are not capable of parsing the other syntax
elements
        // shall omit the other syntax elements.
    }
}
``` textual_tag specifies a single textual tag characterizing the associated image item(s). TagProperty may be associated to the relevant image items by utilizing the ItemPropertyAssociationBox, the syntax of which was described under section (2) "Logical Group Property".

Since item properties are specific to image items, it may be useful to have track-specific mechanisms that are equivalent LogicalGroupProperty and/or TagProperty. In an embodiment, a track-specific box comprises information similar to what is contained in LogicalGroupProperty and/or TagProperty. For example, a track group with type 'Igrp' and/or 'ttag' may be specified, and the TrackGroupTypeBox for these 4CCs may be extended to comprise syntax elements similar to the payload of LogicalGroupProperty and/or TagProperty, respectively.

4. URL Fragment Scheme for Logical Groups and/or Tags

In an embodiment, URL fragment scheme(s) are specified for identifying image items of a particular logical group and/or of a particular tag.

Examples of such URL fragment schemes are given below:

item_group=<group_name>which identifies the entities with the given group name.

item_tag=<textual_tag>which identifies the entities with the given textual tag.

item_property=<property_4cc>.<base64_encoding_of property_content>which identifies the items that are associated with the property of the given four-character code and with the given content for that property, where the content is base64-encoded into the URL fragment.

textual_item_property=<property_4cc>.<utf8_string_of property_content>which identifies the items that are associated with the property of the given four-character code and with the given content for that property, where the content is a UTF8 string in the URL fragment.

When such URL fragment identifier(s) are used with a URL identifying a HEIF file, the URL should be resolved to those items of the HEIF file that match the value(s) given for the fragment identifiers.

5. URL Query Strings for Logical Groups and/or Tags

In an embodiment, URL fragment scheme(s) are specified for identifying image items of a particular logical group and/or of a particular tag.

Examples of such URL query strings include the following:

?item_group=<group_name>

?item_tag=<textual_tag>

?item_property=<property_4cc>.<base64_encoding_of property_content>

?textual_item_property=<property_4cc>.<utf8_string_of property_content>

The semantics are specified similarly to how respective URL fragment schemes are described above.

When such URL query string(s) are used with a requested URL, the URL should be resolved in a manner that HEIF files containing image item(s) that match the value(s) given in the query string(s) are contained in response(s) to the request.

In an embodiment, a file parser or alike has an interface whereby information on the grouping type can be passed to the file parser or alike. The file parser or alike handles the information on the grouping type by processing those entities that match the given information. For example, the file parser may decode and/or return only those entities that match the given information on the grouping type. In an embodiment, the interface comprises a URL fragment and/or a URL query string e.g. as specified in embodiments above.

Figure 2:
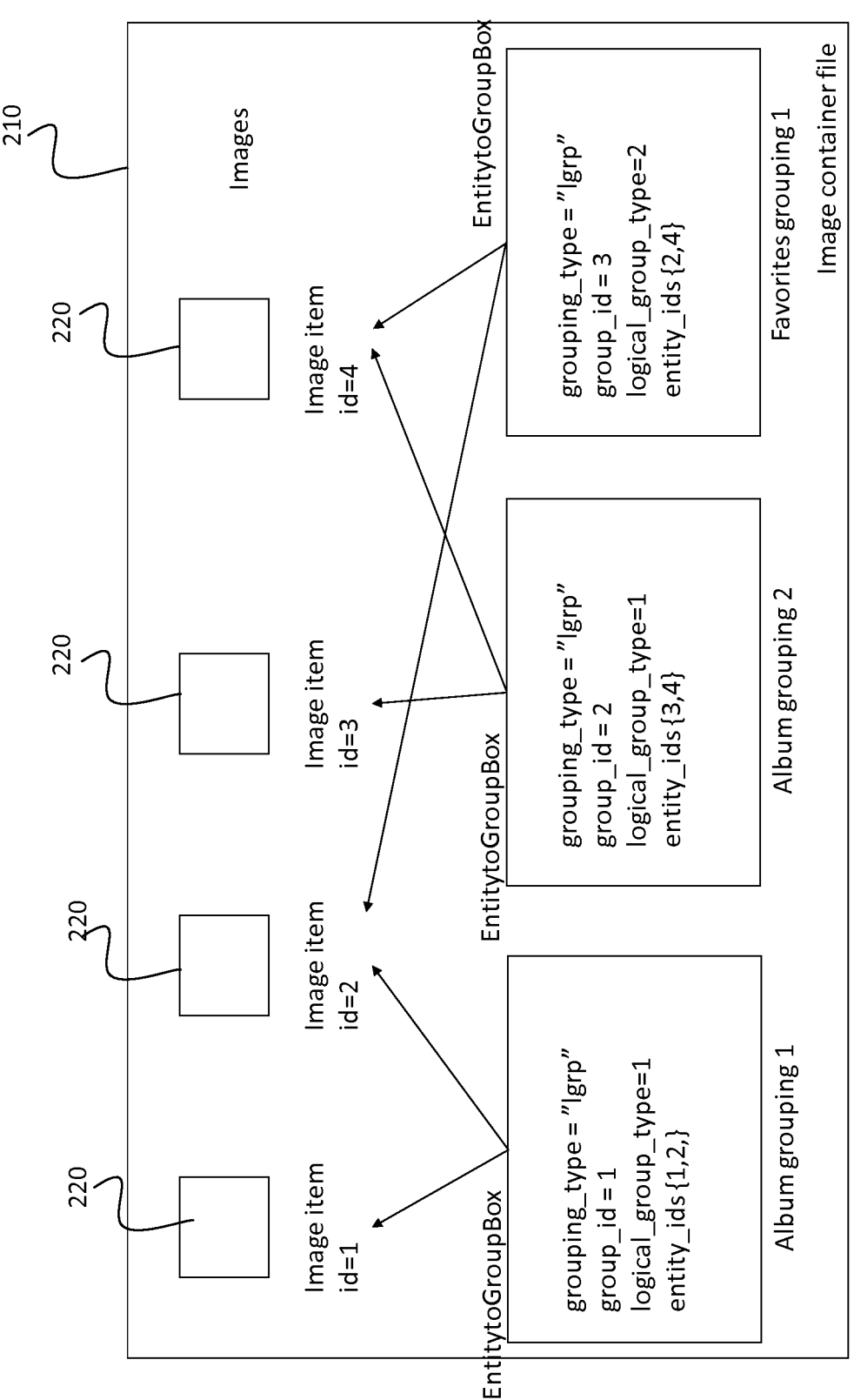
FIG. 2 shows an example of a container according to an embodiment, wherein the container comprises images in different logical groups.

FIG. 2 illustrates an example of an image container file 210 with images 220 in different logical groups as defined in section (1) "Logical Entity to Group Box". Images 220 comprises image items with id=1, id=2, id=3 and id=4. Album grouping 1 groups images with id=1, id=2 together, album grouping 2 groups images with id=3, id=4 together, and favorites grouping groups images with id=1, id=4 together.

Figure 3:
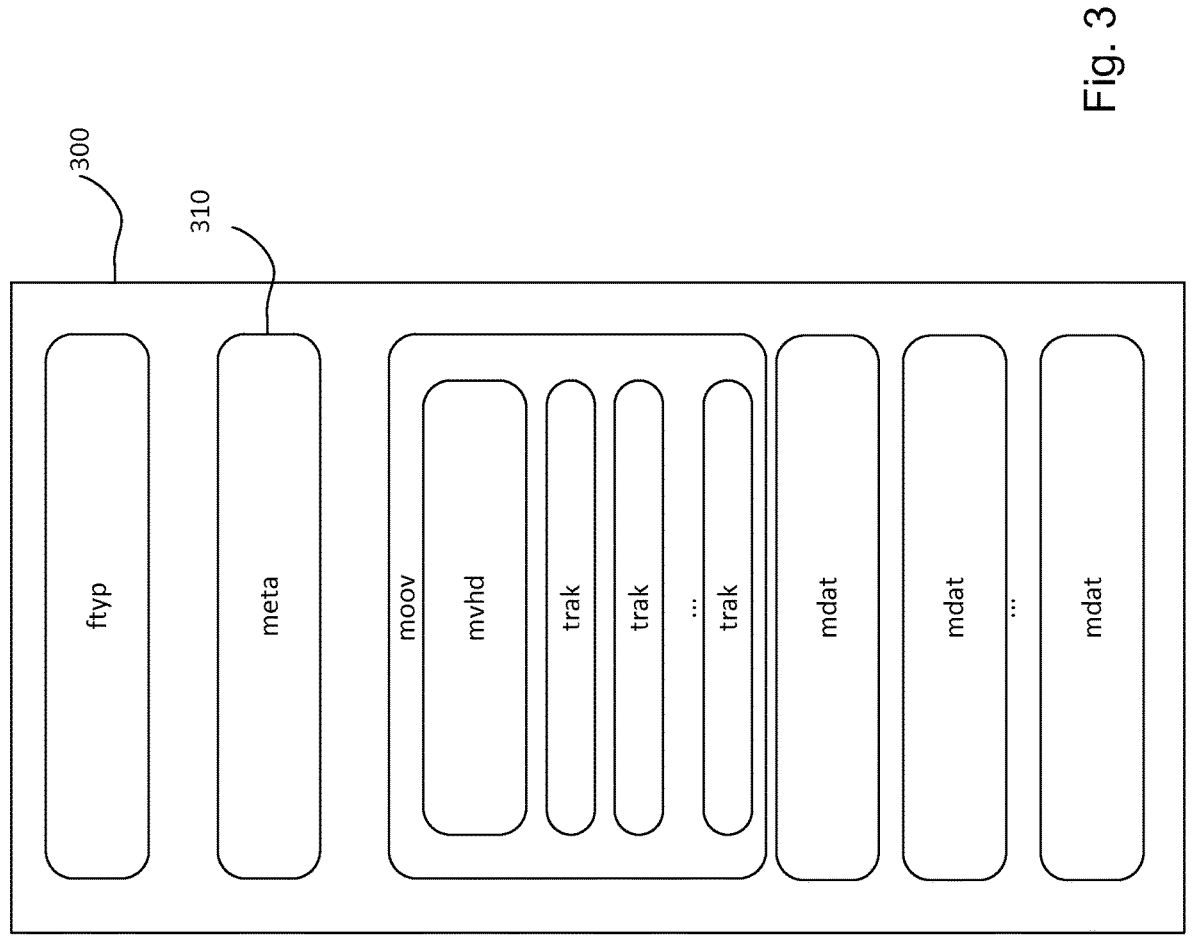
FIG. 3 shows an example of a container file format.

FIG. 3 is a simplified illustration of a container file 300 for storing visual data. The boxes of the container file 300 being shown in FIG. 3 and described in the this paragraph form one example of the container file. Therefore, it should be understood that the amount and types of the boxes may vary in practical implementation. The container file 300 of this example comprises a FileTypeBox "ftyp" for describing the type of the file. MetaBox "meta" of the container file 300 comprises information about metadata, single images and derived images. A MovieBox "moov" comprises image sequences having a plurality of TrackBoxes "trak". The container file 300 may further comprise a plurality of MediaDataBoxes "mdat" for storing payload image data. The grouping definition discussed in the present embodiments is stored in a MetaBox "meta" 310 discussed further with reference to FIG. 4.

Figure 4:
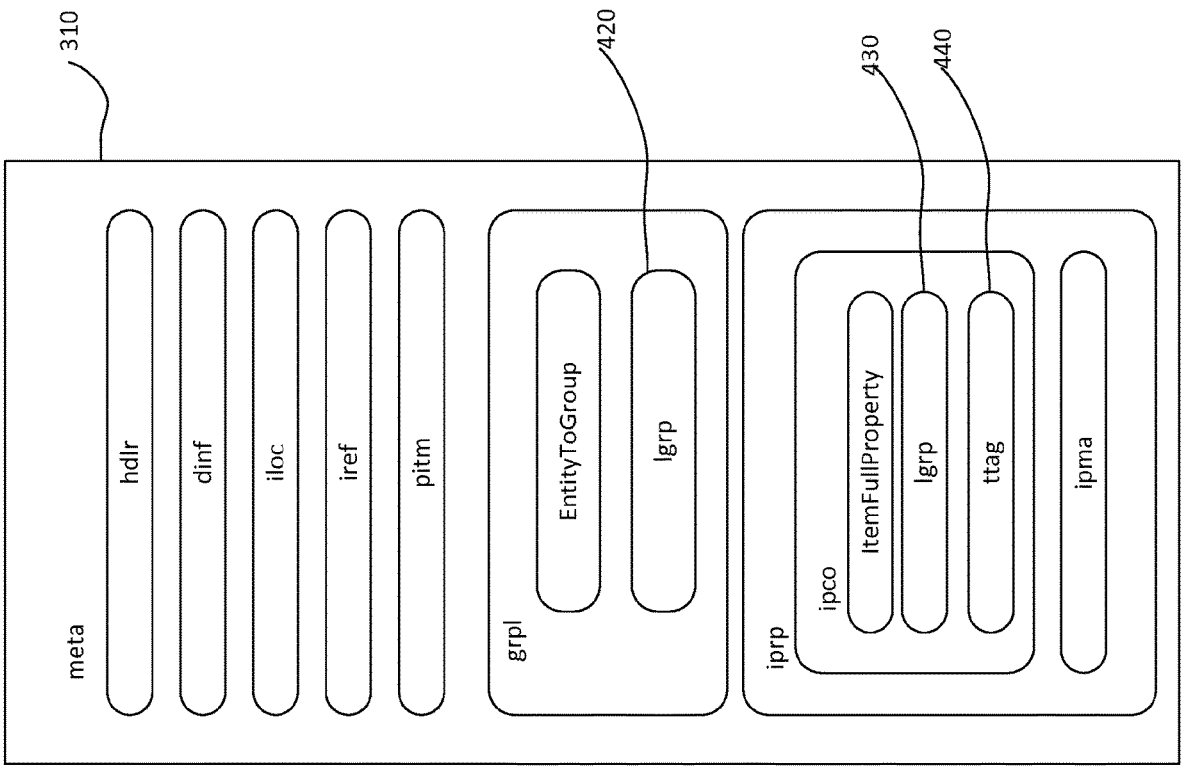
FIG. 4 shows an example of a metadata box according to an embodiment of the container file format.

FIG. 4 illustrates an example of a MetaBox "meta" 310 comprising boxes 'hdlr', 'dinf', 'Hoc', 'iref', 'pitm' as discussed earlier in this description. In addition, the MetaBox 310 comprises GroupsListBox 'grpl' and ItemPropertiesBox 'iprp', to which the present embodiments are related. The GroupsListBox according to the present embodiments comprises LogicalEntityToGroupBox 'Igrp' 420 storing information on the logical grouping of the entities, such as images. Instead or in addition to 'Igrp' 420 of the GroupsListBox, the logical grouping may be defined as a link to appropriate entities in an Item PropertyContainerBox 'ipco' as a LogicalEntityToGroupBox 'Igrp' 430. The Item PropertyContainerBox 'ipco' according to the present embodiment may further comprise DescriptiveItemPropertyBox 'ttag' 440 for indicating a shared textual tag for grouped entities that are associated with the tag.

FIG. 5 is a flowchart illustrating a method according to an embodiment. The method of this embodiment comprises receiving 510 visual data from image capturing means, said visual data comprising a plurality of entities; processing 520 the visual data to determine one or more grouping types for at least selected entities of said plurality of entities; storing 530 said one or more grouping types as a metadata of a container file format, said one or more grouping types being associated with said selected entities; and including 540 the metadata to a container file in association with said visual data.

In an embodiment, rather than receiving visual data from image capturing means, visual data may be received by other means, such as from a communication link and/or an image sharing service.

In an embodiment, rather than or in addition to processing the visual data to determine one or more grouping types, at least a subset of grouping types may be received by other means that may comprise but are not limited to user input and receiving grouping types from a communication link and/or an image sharing service.

An apparatus according to an embodiment comprises means for receiving visual data from image capturing means, said visual data comprising a plurality of entities; means for processing the visual data to determine one or more grouping types for at least selected entities of said plurality of entities; means for storing said one or more grouping types as a metadata of a container file format, said one or more grouping types being associated with said selected entities; and means for including the metadata to a container file in association with said visual data.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving visual data from image capturing means, said visual data comprising a plurality of entities; processing the visual data to determine one or more grouping types for at least selected entities of said plurality of entities; storing said one or more grouping types as a metadata of a container file format, said one or more grouping types being associated with said selected entities; and including the metadata to a container file in association with said visual data.

If desired, the different functions discussed herein may be performed in a different order and/or concurrently with other. Furthermore, if desired, one or more of the above-described functions and embodiments may be optional or may be combined.

The present embodiments has advantages. For example, the embodiments enable grouping of images and video tracks. By utilizing the entity grouping mechanism, one can create logical group of items. Such groups can be easily generated and modified with minimal intervention to the file itself.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
receiving visual data comprising a plurality of image items;
processing the visual data to determine one or more grouping types for at least selected image items of said plurality of image items;
storing said one or more grouping types as metadata of the one or more grouping types, in a container file using a high efficiency image file format, said one or more grouping types being associated with said selected image items, wherein new definitions and constraints for the high efficiency image file format comprise a logical entity to group box, a logical group property with name description and tags, zero or more tag property, and zero or more uniform resource locator query strings for the logical groups and tags; and
including the metadata to the container file in association with said visual data.

2. The method according to claim 1, wherein the plurality of image items comprises at least one of burst images, favorites, album images, image collections, or image sequences.

3. The method according to claim 1, further comprising storing information on the one or more grouping types as a metadata of the container file, wherein at least one uniform resource locator fragment scheme is specified for identifying for the processing image items of a particular group or of a particular tag item property belonging to a particular group characterized by that tag.

4. The method according to claim 1, further comprising storing, as a metadata of the container file, a descriptive information associated with one or more image items of the plurality of image items are determined to share a same grouping type.

5. The method according to claim 1 further comprising transmitting the visual data with said one or more grouping types in said high efficiency image file format to a rendering device or a media processing system, wherein the media processing system is capable of interpreting the transmitted visual data.

6. An apparatus comprising
at least one processor and
at least one memory storing instructions, that when executed by the at least one processor, cause the apparatus at least to:
receive visual data, said visual data comprising a plurality of image items; process the visual data to determine one or more grouping types for at least selected image items of said plurality of image items;
store said one or more grouping types as metadata of the one or more grouping types, in a container file using a high efficiency image file format, said one or more grouping types being associated with said selected image items, wherein new definitions and constraints for the high efficiency image file format comprise a logical entity to group box, a logical group property with name description and tags, zero or more tag property, and zero or more uniform resource locator query strings for the logical groups and tags; and
include the metadata to the container file in association with said visual data.

7. The apparatus according to claim 6, wherein the plurality of image items comprises at least one of burst images, favorites, album images, image collections, or image sequences.

8. The apparatus according to claim 6, wherein the apparatus is further caused to store information on the grouping type as a metadata of the container file.

9. The apparatus according to claim 6, wherein the apparatus is further caused to store as a metadata of the container file a descriptive information in association with one or more image items of the plurality of image items that have been determined to share the same grouping type.

10. The apparatus according to claim 6, wherein the apparatus is further caused to transmit the visual data with said one or more grouping types in said high efficiency image file format to a rendering device or a media processing system, wherein the processing system is capable of interpreting the transmitted visual data.

11. A computer program product comprising at least one non-transitory computer-readable storage medium comprising instructions, where the instructions, when executed by an apparatus, cause the apparatus to perform at least the following:

receive visual data from image capturing apparatus, said visual data comprising a plurality of image items;

process the visual data to determine one or more grouping types for at least selected image items of said plurality of image items;

store said one or more grouping types as metadata of the one or more grouping types in a container file using a high efficiency image file format, said one or more grouping types being associated with said selected image items, wherein new definitions and constraints for the high efficiency image file format comprise a logical entity to group box, a logical group property with name description and tags, zero or more tag property, and zero or more uniform resource locator query strings for the logical groups and tags; and include the metadata to the container file in association with said visual data.

12. The computer program product according to claim 11, wherein the plurality of image items comprises at least one of burst images, favorites, album images, image collections, or image sequences.

13. The computer program product according to claim 11, wherein the instructions, when executed by an apparatus, further causes the apparatus to store information on the grouping type as a metadata of the container file.

14. The computer program product according to claim 11, wherein the instructions, when executed by an apparatus, further causes the apparatus to store as a metadata of the container file a descriptive information in association with one or more image items of the plurality of image items that have been determined to share the same grouping type.

15. The computer program according to claim 11, wherein the apparatus is further caused to transmit the visual data with said one or more grouping types in said high efficiency image file format to a rendering device or a media processing system, wherein the processing system is capable of interpreting the transmitted visual data.

* * * * *